United States Patent
Nayar

[11] Patent Number: 5,760,826
[45] Date of Patent: Jun. 2, 1998

[54] OMNIDIRECTIONAL IMAGING APPARATUS

[75] Inventor: Shree K. Nayar, New York, N.Y.

[73] Assignee: The Trustees of Columbia University, New York, N.Y.

[21] Appl. No.: 644,903

[22] Filed: May 10, 1996

[51] Int. Cl.$^6$ ..................................................... H04N 7/18
[52] U.S. Cl. ............................................. 348/36; 348/143
[58] Field of Search ................................. 348/36, 38, 143, 348/147, 117; 396/351, 21, 427; 359/859, 853, 838–884

[56] References Cited

U.S. PATENT DOCUMENTS

| | | |
|---|---|---|
| 4,549,208 | 10/1985 | Kamejima et al. ............... 348/36 |
| 5,185,667 | 2/1993 | Zimmermann . |
| 5,359,363 | 10/1994 | Kuban et al. . |
| 5,530,650 | 6/1996 | Biferno et al. ............... 348/117 |
| 5,563,650 | 10/1996 | Poelstra ............... 348/36 |
| 5,610,391 | 3/1997 | Ringlien ............... 250/223 B |

FOREIGN PATENT DOCUMENTS 8275066   10/1996   Japan .

OTHER PUBLICATIONS

S. Bogner, "An Introduction to Panospheric Imaging", Proceedings of the 1995 IEEE International Conference on Systems, Man and Cybernetics, pp. 3099–3106 (1995).

S. Bogner, "Application of Panospheric Imaging to an Armored Vehicle Viewing System", Proceedings of the 1995 IEEE International Conference on Systems, Man and Cybernetics, pp. 3113–3116 (1995).

J. Murphy, "Application of Panospheric Imaging to a Teleoperated Lunar Rover", Proceedings of the 1995 IEEE International Conference on Systems, Man and Cybernetics, pp. 3117–3121 (1995).

John R. Murphy, A Robotics Ph.D. Thesis Proposal Effective Teleoperation Through Immersive Visualization, The Robotics Institute Carnegie Mellon University, pp. 1–19 (May 10, 1995).

E. Hall et al., "Omnidirectional Viewing Using a Fish Eye Lens," SPIE—Optics, Illumination, and Image Sensing for Machine Vision, vol. 728, pp. 250–256 (1986).

S. Zimmermann et al., "A Video Pan/Tilt/ Magnify/Rotate System with no Moving Parts," *Proceedings of 1992 IEEE/ AIAA 11th Digital Avionics Systems Conference*, pp. 523–531 (IEEE, 1992) (Zimmermann et al. Article).

K. Yamazawa et al., "Obstacle Detection with Omnidirectional Image Sensor HyperOmni Vision," Proceedings of 1995 IEEE International Conference on Robotics and Automation, vol. 1, pp. 1062–1067 (IEEE 1995).

Y. Yagi et al., "Evaluating Effectivity of Map Generation by Tracking Vertical Edges in Omnidirectional Image Sequence," Proceedings of 1995 IEEE International Conference on Robotics and Automation, vol. 3, pp. 2334–2339 (IEEE 1995) (Yagi et. al. II).

Y. Yagi et al., "Map–based Navigation for a Mobile Robot with Omnidirectional Image Sensor COPIS," IEEE Transactions on Robotics and Automation, vol. 11, No. 5, pp. 634–648 (IEEE Oct. 1995) (Yagi et. al. I).

V. Nalwa, "A True Omni–Directional Viewer," Bell Laboratories Technical Memorandum, BL0115500–960115–01 (Jan. 1996).

*Primary Examiner*—Amelia Au
*Attorney, Agent, or Firm*—Baker & Botts, L.L.P.

[57] ABSTRACT

The invention disclosed herein is an omnidirectional imaging apparatus for sensing an image of a substantially hemispherical scene from a single viewpoint, including a truncated, convex, substantially paraboloid-shaped reflector positioned to orthographically reflect an image of the substantially hemispherical scene, and an image sensor positioned to receive the orthographically reflected image. Also disclosed herein is an omnidirectional image projection apparatus for projecting an image of a substantially hemispherical scene as viewed from a single viewpoint, including a means for projecting a collimated beam of light modulated with the image, and a truncated convex substantially paraboloid-shaped reflector positioned to orthographically reflect the collimated beam of light modulated with the image, to project the hemispherical scene.

22 Claims, 9 Drawing Sheets

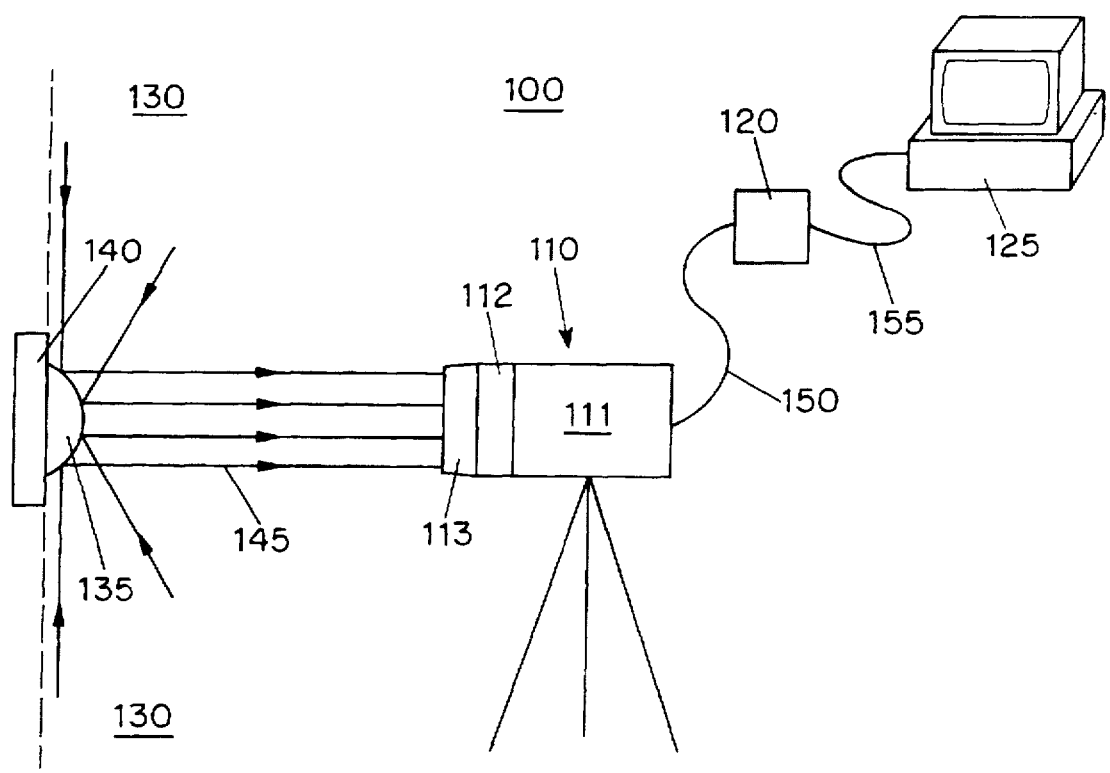
FIG. 1a
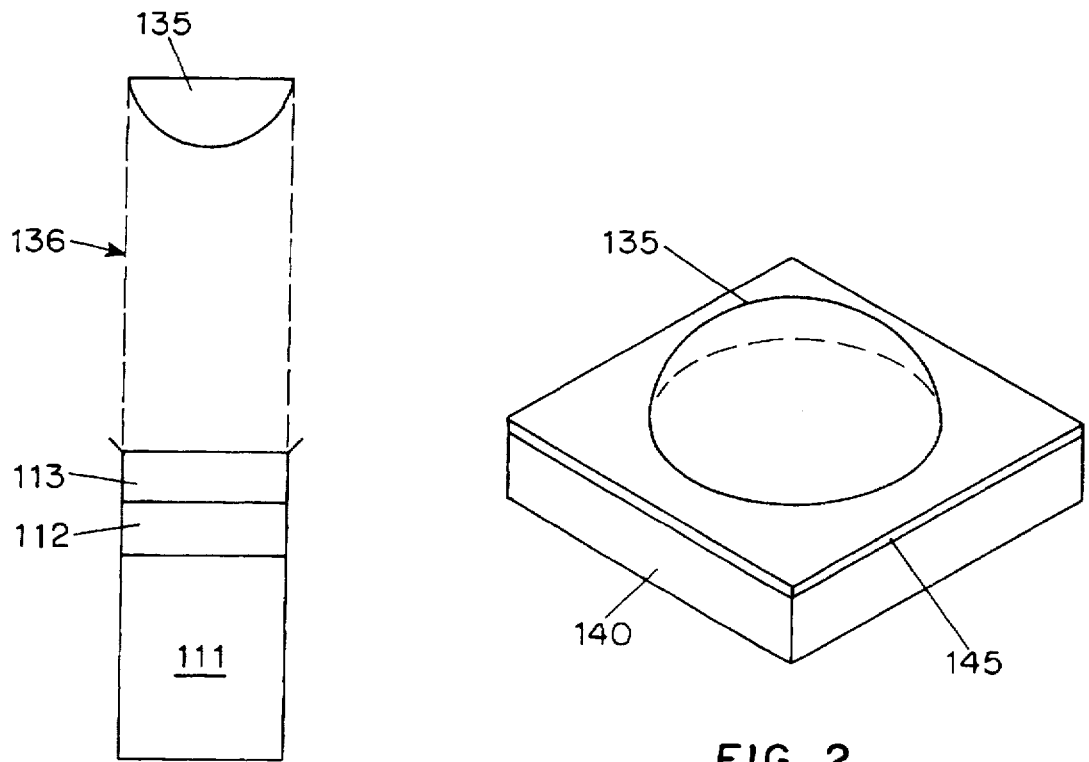
FIG. 1b
FIG. 2

OMNIDIRECTIONAL IMAGING APPARATUS

NOTICE OF GOVERNMENT RIGHTS

The U.S. Government has certain rights in this invention pursuant to the terms of the National Science Foundation Young Investigator Award and the Department of Defense/ Office of Nuclear Research MURI Grant No. 00014-95-1-0601.

BACKGROUND OF THE INVENTION

1. Field of the Invention

This invention relates to omnidirectional image sensing and projection with reference to a single viewpoint, and, more particularly to such image sensing and projection using a truncated, convex, substantially paraboloid-shaped reflector.

2. Discussion of the State of the Art

For many applications such as surveillance, teleconferencing, remote sensing, photogrammetry, model acquisition, virtual reality, computer graphics, machine vision and robotics, it is desirable that an imaging system have a large field of view so as to be able to take in as much information as possible about the world around it.

Traditional imaging systems include a camera with a lens that provides a perspective projection of an image. However, a camera with even a very wide angle lens has only a limited field of view (i.e., covering less than a full hemisphere). This limited field of view may be expanded by tilting and panning the entire imaging system about its center of projection. One such system is described in S. E. Chen, "Quicktime VR—An Image-Based Approach to Virtual Environment Navigation", Proc. of SIGGRAPH 95, (8):29–38, Aug. (1995). The article by L. McMillan and G. Bishop, "Plenoptic Modeling: An Image-Based Rendering System", Computer Graphics: Proc. of SIGGRAPH, August 1995, pp. 39–46, also describes a traditional pan-and-tilt system. This type of system has two serious drawbacks, however, one being the obvious disadvantages associated with a device having critical moving parts, and the second being the significant amount of time required to make a full rotation in order to view the surrounding world. This time limitation makes such a device unsuitable for real-time applications.

Another approach to increasing the field of view in an imaging system is by employing a so called "fish eye" lens as is disclosed in E. L. Hall et al., "Omnidirectional Viewing Using a Fish Eye Lens", SPIE Vol. 728 Optics, Illumination, and Image Sensing for Machine Vision (1986), p. 250. Since the fish eye lens has a very short focal length, the field of view may be as large as a hemisphere. The use of such lenses in an imaging system is problematic, however, in that they are significantly larger and more complex than conventional lenses. Moreover, it has been difficult to develop a fish eye lens with a fixed viewpoint for all points of the relevant scene. U.S. Pat. No. 5,187,667 to Zimmerman, and U.S. Pat. No. 5,359,363 to Kuban et al. are also directed to the use of fish eye lenses to replace conventional pan and tilt mechanisms, and accordingly suffer from the same disadvantages.

Other prior art devices have used reflecting surfaces to increase the field of view. One such prior art device is disclosed in V.S. Nalwa, "A True Omni-Directional Viewer", ATT Bell Laboratories Technical Memorandum, BL0115500-960115-01, Jan. 1996. Nalwa discloses the use of multiple planar reflecting surfaces in conjunction with multiple charged coupled device ("CCD") cameras to obtain a 360 degree panoramic image of a 50 degree band of a hemispherical scene. Specifically, in Nalwa, four planar mirrors are arranged in the shape of a pyramid, with one camera being positioned above each of the four planar reflecting sides, and with each camera viewing slightly more than 90 degrees by 50 degrees of the hemispherical scene. This system suffers from the serious drawback of requiring multiple sensors to capture a hemispherical image. In addition, this system suffers from the inherent problems associated with distortion at the "seams" when the separate images are combined to provide a full 360 degree view.

Curved reflective surfaces have also been used in conjunction with image sensors. It is well known in the art, however, that for perspective projection, the only reflecting surface which will generate an image of the world as seen from a single viewpoint is a plane which passes through the midpoint of the line segment between the lens and the viewpoint, with its normal in the direction of the line segment. Thus, for perspective projection, any curved surface will necessarily have multiple viewpoints.

Both Yagi et al., "Evaluating Effectivity of Map Generation by Tracking Vertical Edges in Omnidirectional Image Sequence", IEEE International Conference on Robotics and Automation, June 1995, p. 2334, and Yagi et al., "Map-Based Navigation for a Mobile Robot With Omnidirectional Image Sensor COPIS", IEEE Transactions on Robotics and Automation, Vol. II, No. 5, Oct. 1995, disclose a conical projection image sensor (COPIS) which uses a conical reflecting surface to gather images from the surrounding environment, and processes the information to guide the navigation of a mobile robot. Although COPIS is able to attain viewing in 360 degrees, it is not a true omnidirectional image sensor because the field of view is limited by the vertex angle of the conical mirror and by the viewing angle of the camera lens. Furthermore, as discussed above, reflection off the curved surface results in multiple viewpoints, the locus of viewpoints for a cone being a circle. Multiple viewpoints cause significant distortion and require complex manipulation and translation of the image to reconstruct the scene as viewed from a single viewpoint.

Yamazawa et al., "Obstacle Detection With Omnidirectional Image Sensor HyperOmni Vision", IEEE International Conference on Robotics and Automation, Oct. 1995, p. 1062, discloses a purported improvement in the COPIS system which involves the use of a hyperboloidal reflecting surface in place of a conical surface. As discussed therein, the rays of light which are reflected off the hyperboloidal surface, no matter where the point of origin, will all converge at a single point, thus enabling perspective viewing. Although the use of a hyperboloidal mirror is advantageous in that it enables full perspective image sensing, because the rays of light which make up the reflected image converge at the focal point of the reflector, positioning of the sensor relative to the reflecting surface is critical, and any disturbance will impair the image quality. Further, the use of a perspective-projection model inherently requires that as the distance between the sensor and the mirror increases, the cross-section of the mirror must increase. Therefore, practical considerations dictate that in order to keep the mirror at a reasonable size, the mirror must be placed close to the sensor. This in turn causes complications to arise with respect to the design of the image sensor optics. In addition, mapping sensed image to usable coordinates requires complex calibration due to the nature of the converging image.

The above-described prior art devices fail to provide a truly omnidirectional imaging apparatus that is capable of sensing a substantially hemispherical scene from a single viewpoint. These devices also fail to achieve an imaging system in which any selected portion of a substantially hemispherical scene can be viewed, or the scene can be panned, both without requiring frame reconstruction or complex frame transformation.

SUMMARY OF THE INVENTION

The drawbacks of the prior art, as discussed above, are substantially improved by the present invention, which in one aspect is an omnidirectional imaging apparatus having a truncated substantially paraboloid-shaped reflector positioned to orthographically reflect an image of a substantially hemispherical scene, where the reflector's focus point is coincident with the single viewpoint. An image sensor is positioned to receive the orthographic reflection of the image.

In one embodiment of the invention, the surface of the reflector substantially obeys the equation, $$z = \frac{h^2 - r^2}{2h},$$

expressed in cylindrical coordinates, where r is the radial coordinate, z the axis of rotation, and h is a constant. As the equation represents a symmetrical surface of rotation, the shape of the surface is not a function of the angular coordinate $\phi$. The reflector is truncated at a plane which is substantially perpendicular to the z axis and which includes the focus point of the paraboloidal reflector. The image sensor is preferably positioned along an optical axis which coincides with the z axis of the reflector.

In an exemplary arrangement, the image sensor is electronic and provides an image signal which is representative of the orthographically reflected image. This image signal is digitized and transferred to an image processing apparatus. The image processing apparatus is advantageously adapted to enable viewing of any portion of the hemispherical scene, enlarging portions of the scene, and panning of the scene from a predetermined viewpoint.

Another exemplary embodiment of the invention includes an additional convex substantially paraboloid-shaped reflector positioned to orthographically reflect an image of an additional hemispherical scene from a single viewpoint. The hemispherical scene and the additional hemispherical scene are complementary to on another so that the combination thereof is a spherical scene. An additional image sensor is positioned to receive the image which is orthographically reflected from the additional reflector.

In this embodiment, the reflector and the additional reflector are positioned back-to-back, and have a common z-axis aligned with the optical axis, and a common focus point. Each is truncated at a plane which is substantially perpendicular to the common z-axis and which includes the common focus point.

Another aspect of the present invention is an omnidirectional image projection apparatus for projecting an image representing a substantially hemispherical scene as viewed from a single viewpoint. The omnidirectional image projection apparatus includes a collimated light source behind an transparent medium having an image of a hemispherical scene, so as to project a collimated beam of light modulated (spatially and possibly temporarily) with the image, and a truncated convex substantially paraboloid-shaped reflector positioned to orthographically reflect the collimated beam of light modulated with the image, and thereby project the substantially hemispherical scene.

Another exemplary embodiment of the omnidirectional image projection apparatus includes an additional light source and image-bearing transparent medium so as to project another collimated beam of light modulated with another image representing an additional substantially hemispherical scene as viewed from a single viewpoint. The hemispherical scene and the additional hemispherical scene are complementary to each other so that the combination thereof is a substantially spherical scene. An additional truncated convex substantially paraboloid-shaped reflector is positioned to orthographically reflect the additional collimated beam of light so as to project the additional hemispherical scene. The reflector and the additional reflector are positioned back-to-back, and have a common optical axis and a common focus point. Each is truncated at a plane which is substantially perpendicular to the optical axis and which includes the focus point.

The present invention also provides a method for sensing an image of a substantially hemispherical scene from a single viewpoint, which in an exemplary embodiment comprises the steps of (a) orthographically reflecting an image of the substantially hemispherical scene on a substantially paraboloid-shaped reflecting surface such that the single viewpoint coincides with the focus point of the reflecting surface, and (b) sensing the orthographically reflected image. Step (b) may include sensing the substantially orthographically reflected image from a position along the optical axis of the reflector.

In another exemplary embodiment of the imaging method there is included the further steps of providing an image signal which is representative of the orthographically reflected image, converting the image signal into image data, mapping the image data into a cartesian-coordinate system, interpolating the image data, and forming a digital image from the mapped image data and the interpolated image data. If desired, after specifying a viewing direction, a focal length, and an image size, this selected portion of the image can be zoomed in on before performing the interpolation step.

Finally, in yet another exemplary embodiment of the imaging method there is included the further steps of orthographically reflecting an additional image of a substantially hemispherical scene on an additional substantially paraboloid-shaped reflecting surface such that the single viewpoint of the additional scene coincides with a focus point of the additional reflecting surface, and sensing the additional orthographically reflected image.

The present invention also provides a method for projecting an image representative of a substantially hemispherical scene as viewed from a single viewpoint, which in an exemplary embodiment includes the steps of (a) projecting a collimated beam of light on a substantially paraboloid-shaped reflecting surface modulated (spatially and possibly temporarily) with the image, and (b) orthographically reflecting the collimated beam of light modulated with the image on a substantially paraboloid-shaped reflecting surface such that the single viewpoint of the image coincides with a focus point of the orthographic reflecting surface.

Another exemplary embodiment of the image projecting method includes the steps of projecting an additional collimated light beam modulated with an additional image representative of an additional substantially hemispherical scene as viewed from a single viewpoint, and orthographically reflecting the additional collimated beam of light modulated with the additional image to project the additional hemispherical scene which is complementary to the other hemispherical scene.

BRIEF DESCRIPTION OF THE DRAWINGS

Exemplary embodiments of the present invention will now be described in detail with reference in the accompanying drawings in which:

FIG. 1a is a side view of an exemplary embodiment of an omnidirectional imaging apparatus;

FIG. 1b is a side view of an alternate embodiment in which a paraboloid-shaped reflector is connected too an image sensor by a transparent support;

FIG. 2 is an isometric view of a paraboloid-shaped reflector mounted on a base plate;

DETAILED DESCRIPTION

Figure 3:
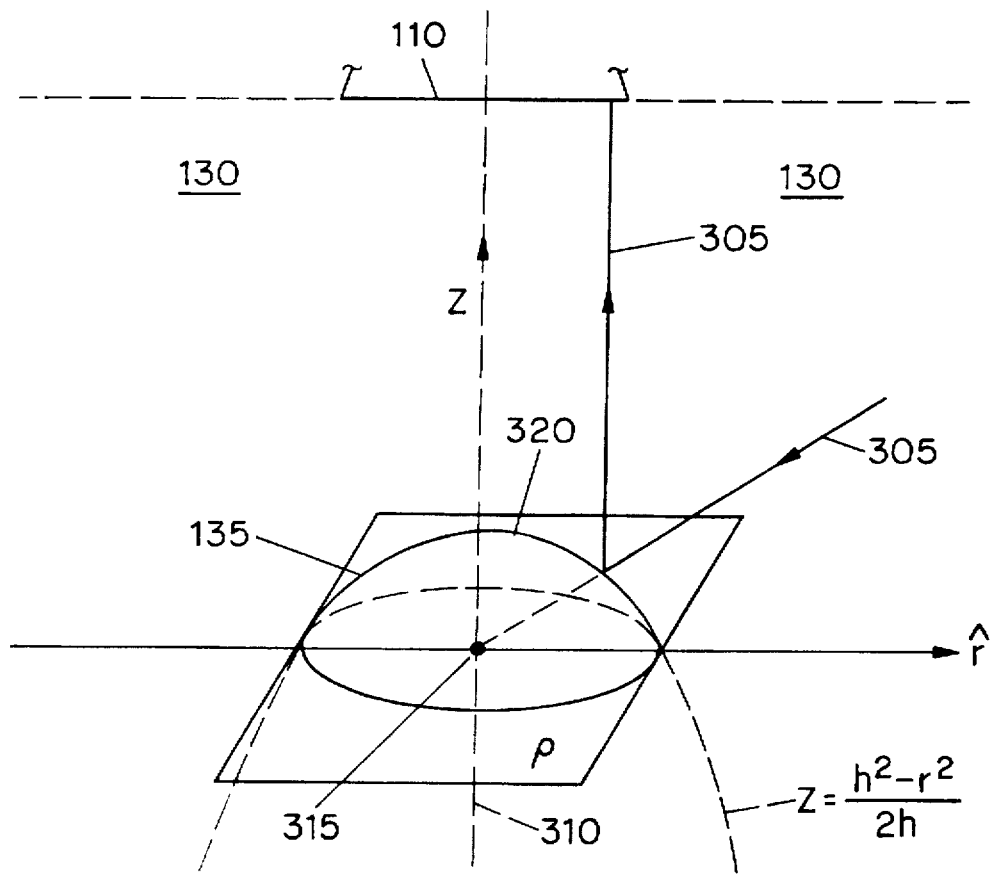
FIG. 3 is a partially isometric view of a paraboloid-shaped reflector mapped into a cylindrical coordinate system.

FIG. 1a illustrates an omnidirectional imaging apparatus 100 according to an exemplary embodiment of the present invention. A convex paraboloid shaped reflector 135, which is mounted on a base plate 140, is positioned to orthographically reflect an image of a substantially hemispherical scene 130. An image sensor 110, such as a commercially available Sony 3CCD color video camera device 111 having magnifying lens 112 and a telecentric lens or a telecentric aperture 113, is positioned to receive the orthographic reflection of the image. The telecentric lens 113 functions to filter out all rays of light which are not perpendicular to the plane of the lens, i.e., background light which does not form part of the orthographic reflection of the hemispherical scene.

Although the description herein is with regard to visible light, the present invention has equal application to other forms of electromagnetic radiation such as ultraviolet light or infrared light.

In an alternate exemplary embodiment of the imaging apparatus 100 according to the invention shown in FIG. 1b, the paraboloid-shaped reflector may be coupled to the image sensor by a transparent support 136, such as a length of clear tubing.

Referring again to FIG. 1a, the video camera 110 generates an analog video signal representative of the orthographically reflected image which is sent through cable 150. The video signal is converted to a digital signal by digitizer 120, which is a commercially available NTSC video signal analog-to-digital converter.

The digital signal is then sent through a cable 155 to a general purpose computer 125, such as a DEC Alpha 3000/600 workstation. As will be explained in further detail, the computer 125 is programmed to allow the user to view any desired portion of the hemispherical scene, to zoom in on a selected portion of the scene, or to pan the scene in any desired manner.

The image sensor 110 may simply be a still or motion picture photographic camera using conventional photographic film. The image sensor 110 may also be a camcorder or video camera 116 which provides a digital video signal output, which can be provided directly to the computer 125 without the need for the analog-to-digital converter 120.

FIG. 2 shows an isometric view of the paraboloid-shaped reflector 135, which extends from base 140 from which it is formed. The entire surface of the base 140, including the reflector 135, is coated with a thin layer 145 of highly reflective metal, such as silver.

FIG. 3 illustrates in greater detail, the preferred geometry of the paraboloid-shaped reflector 135, as well as the orthographic reflection of the image of the substantially hemispherical scene 130 onto the image sensor 110. The reflector 135 of FIG. 3 is defined in cylindrical coordinates, r, $\phi$ and z, as substantially obeying the equation $$z = \frac{h^2 - r^2}{2h}, \qquad (1)$$

where z is the axis of rotation, r is the radial coordinate, and h is a constant. The z axis coincides with the optical axis of the imaging arrangement, and a focus point 315 of the paraboloid defined by equation (1) coincides with the origin of the coordinate system. The reflector 135 of FIG. 3 is truncated at a plane p which is substantially perpendicular to the z axis 310 and which includes the focus point 315 of its paraboloidal surface.

All incoming rays 305 that would otherwise pass through the focus point 315, are orthographically reflected towards the image sensor 110 by the reflecting paraboloidal surface. Thus, the focus point 315 is coincident with the single viewpoint from which the substantially hemispherical scene 130 is viewed. The image sensor 110 is positioned along the optical axis 310 of the imaging system and the photosensitive surface thereof is perpendicular to the optical axis.

The use of orthographic reflection to enable viewing of a substantially hemispherical scene from a single viewpoint is an advantageous feature of the present invention, as it is well known in the art that reflection from a curved surface that provide perspective projection results in multiple viewpoints.

Figure 4:
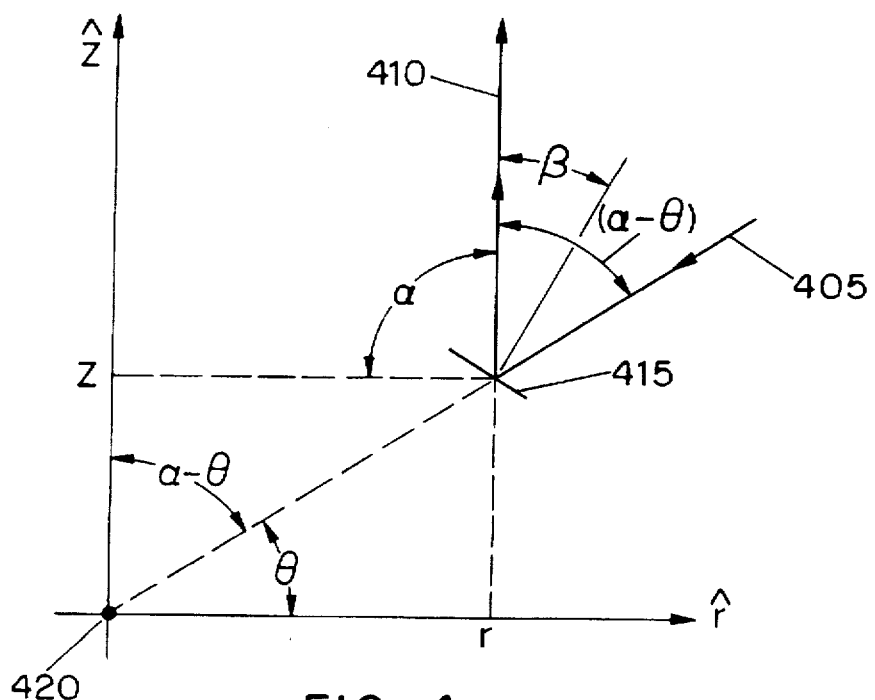
FIG. 4 is a geometric representation of orthographic reflection from a curved reflecting surface.

That orthographic reflection enables viewing from a single viewpoint can be demonstrated by reference to FIG. 4. In FIG. 4, z and r are perpendicular cylindrical coordinates for a given value of $\phi$, the angular coordinate. The angle of an incoming ray 405 relative to the r axis is $\theta$. The incoming ray 405 is orthographically reflected by the reflecting surface 415 as an outgoing ray 410.

To have a single viewpoint 420, any incoming ray must satisfy $$\tan(\theta) = z/r, \qquad (2)$$

and for orthographic reflection, all rays must be reflected at an angle $$\alpha = \pi/2, \quad (3)$$

where $\alpha$ is the angle between the outgoing ray 410 and the axis. For these two constraints to be satisfied, and for the angle of incidence to equal the angle of reflection, it is clear that the angle, $\beta$, between the reflected ray 410 and the normal direction of the surface at the point of reflection, fi, must equal $$\beta = \frac{\alpha - \theta}{2} \text{ or } \beta = \frac{\pi - 2\theta}{4}, \quad (4)$$

which can also be expressed as $$\tan 2\beta = \frac{\tan\alpha - \tan\theta}{1 + \tan\alpha \tan\theta} = \frac{2\tan\beta}{1 - \tan^2\beta}. \quad (5)$$

Finally, the slope of the reflecting surface 415 in the ẑ-r̂ plane at the point of reflection is $$z' = \frac{dz}{dr} = -\tan\beta. \quad (6)$$

Substituting (6) and (4) into (5) yields $$\frac{-2\frac{dz}{dr}}{1 - \left(\frac{dz}{dr}\right)^2} = \frac{r}{z}. \quad (7)$$

The quadratic expression of equation (7) can be solved to obtain two solutions for $$\frac{dz}{dr},$$

but to avoid self occlusion by the reflecting surface, the slope of the curve in the right quadrant is made negative (i.e., the surface is convex). The result is $$\frac{dz}{dr} = \frac{z}{r} - \sqrt{1 + \left(\frac{z}{r}\right)^2}. \quad (8)$$

If a=z/r, the above expression reduces to $$a + \sqrt{1 + a^2} = \frac{h}{r}, \quad (9)$$

where h is a constant of integration. Substituting z=ra into equation (9) yields equation (1).

Thus, there exists a curve, which when rotated about the ẑaxis, generates a surface that will allow orthographic reflection of a substantially hemispherical scene from a single viewpoint. This curve is the parabola defined by equation (1), which has a single viewpoint that is coincident with the focus 420 of the parabola.

In addition to providing viewing of a substantially hemispherical scene from a single viewpoint, the omnidirectional imaging apparatus in accordance with the present invention enables viewing of any portion of the scene, enables zooming in on a selected portion, and enables panning of the scene in any manner, all with respect to the single viewpoint and without requiring image reconstruction or complex frame transformation.

Figure 5:
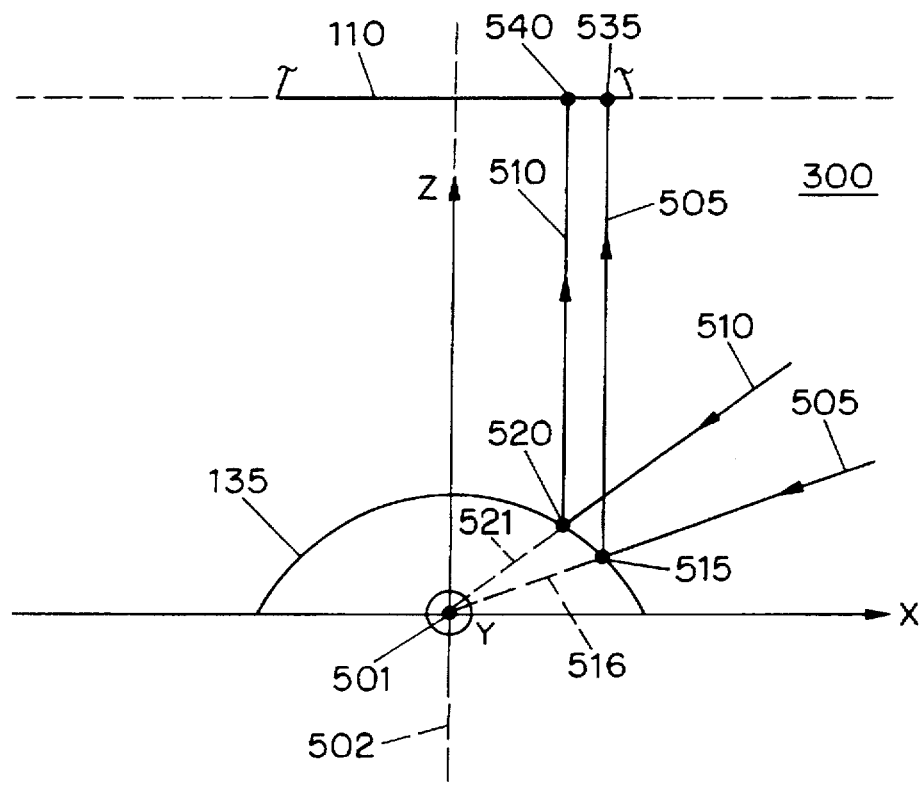
FIG. 5 is an illustration of orthographic reflection from a substantially paraboloid-shaped reflector to an image sensor.

FIG. 5 illustrates how a portion of the substantially hemispherical scene is viewed by the image sensor from a single viewpoint. A truncated convex substantially paraboloid-shaped reflector 135 is mapped into a cartesian coordinate system. The optical axis 502 of the imaging arrangement is coincident with the z axis, and the focus 501 of the substantially paraboloidal reflector 135 is located at the origin. Incoming rays 505, 510 from a portion of the scene 300 being viewed intersects the reflecting surface at points 515 and 520, which can be defined by their respective x and y coordinates. Point 515 and 520 lie along imaginary radial lines 516 and 521, respectively, which originate at the viewpoint of the scene, i.e., the focus 501 of the paraboloidal reflector. Since these rays are orthographically reflected toward the image sensor 110, which has a planar light-sensitive surface perpendicular to the z-axis, the projected rays will intersect the light-sensitive surface at the same respective x and y coordinates. Only the z coordinate will change. Accordingly, there is a one-to-one correspondence between the x-y coordinate of the point of intersection with the reflector 135 of the orthographically projected ray, and the x-y coordinate of the point at which that orthographically projected ray intersects the planar light-sensitive surface of the image sensor 110.

In a preferred arrangement, the image sensor 110 includes a planar-charged coupled device ("CCD") image sensor having an array of light sensing elements. Each cell senses the intensity of light at its particular location in the array. Therefore, with a one-to-one correspondence, the image signals produced by the CCD cells which cover a particular range of x-y coordinates in the grid is representative of the rays which are orthographically reflected from the reflecting surface 135 at points within the same range of x-y coordinates. Thus, mapping of the image is a simple task for persons skilled in the art.

With the one-to-one correspondence explained above in mind, FIG. 6 illustrates a technique for zooming in on any selected portion of the substantially hemispherical scene. The reflector 135 is positioned relative to orthogonal x, y and z axes in the same manner as in FIG. 5. In order to zoom in at a focal distance f on a selected portion of the scene centered around a point 550, with a specified size, only the image signals of the CCD cells located with the same range of x-y coordinates as the region of the reflecting surface projecting the selected portion of the scene are selected for magnification and viewing.

Figure 6:
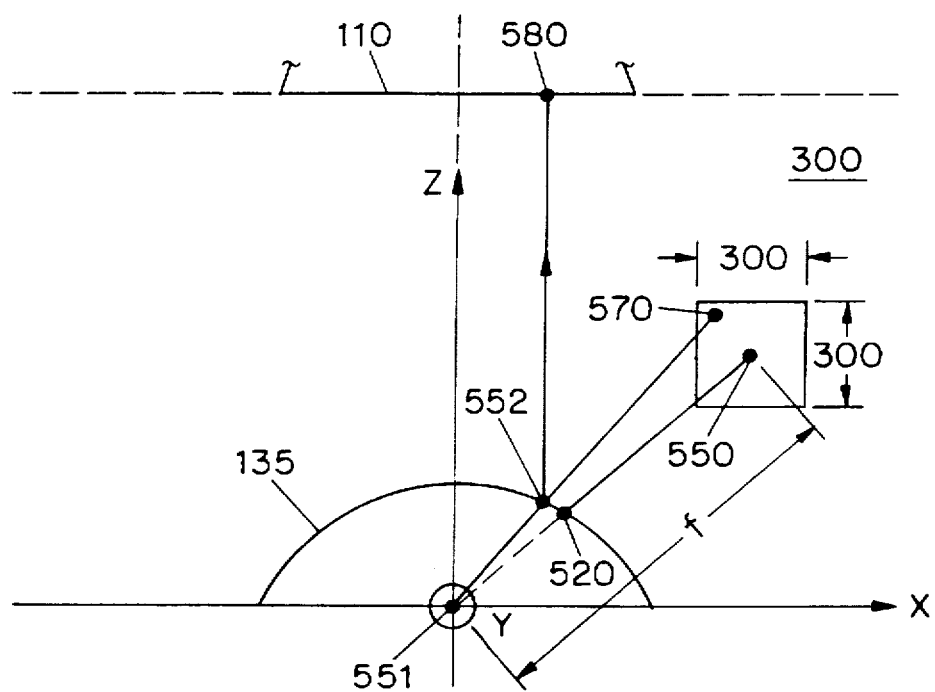
FIG. 6 illustrates how any selected portion of a hemispherical scene can be viewed from the single viewpoint.

More particularly, to determine the appropriate light intensity for point 570 in the selected portion of the scene, the light intensity signal generated by the CCD cell which lies at 580 is chosen. As shown in FIG. 6, a line segment drawn between point 570 and focus point 551 intersects the reflector 135 at point 552. The light intensity at point 570 is set equal to that represented by the image signal generated by the CCD cell at 580 which is located at the x-y coordinate on the grid nearest to the x-y coordinate of point 552. The same is repeated for each CCD cell within the same range of x-y coordinates as the region of the reflecting surface projecting the selected portion of the scene. As a result of the orthographic reflection and the one-to-one correspondence described above, no image reconstruction or complex frame transformation is required.

A general purpose computer 125 can be readily programmed by one skilled in the art to perform the above steps to enable viewing of any portion of the hemispherical scene from a single viewpoint, and to also enable zooming in on any particular portion to provide an enlarged image of that portion. Furthermore, by designating successive points along the reflector, the hemispherical scene can be panned as if one were viewing the scene from a single viewpoint.

In the embodiment discussed above, it is readily apparent that as one zooms in on smaller portions of the scene, the number of CCD cells providing information to the computer 125 is reduced, and hence the granularity of the viewed image is increased. In a preferred embodiment, information about points in the scene which do not exactly correspond to CCD cells are more closely approximated by interpolation. A suitable interpolation program which may be executed on computer 125 is included in Appendix I to this specification. The program attached as Appendix I will map the sensed omnidirectional image to an ordinary perspective image that is suitable for display on Computer 125. The program requires the user to input the name, center location, and radius of the omnidirectional image to be converted. The program also requires the user to input a name for the generated perspective image, as well as a focal length and size for the perspective image.

Thus, instead of simply choosing the image signal generated by the nearest CCD cell to represent portions of the image which do not precisely correspond to a CCD cell, the image for such scene portions is estimated by the appended program based on a suitable average of image signals generated by CCD cells which correspond to neighboring portions of the scene. Of course, more sophisticated interpolation programs known to those skilled in the art, such as those that are based on polynomial or temporal matching, may be used without departing from the scope of the invention, as defined by the claims herein.

Figure 7:
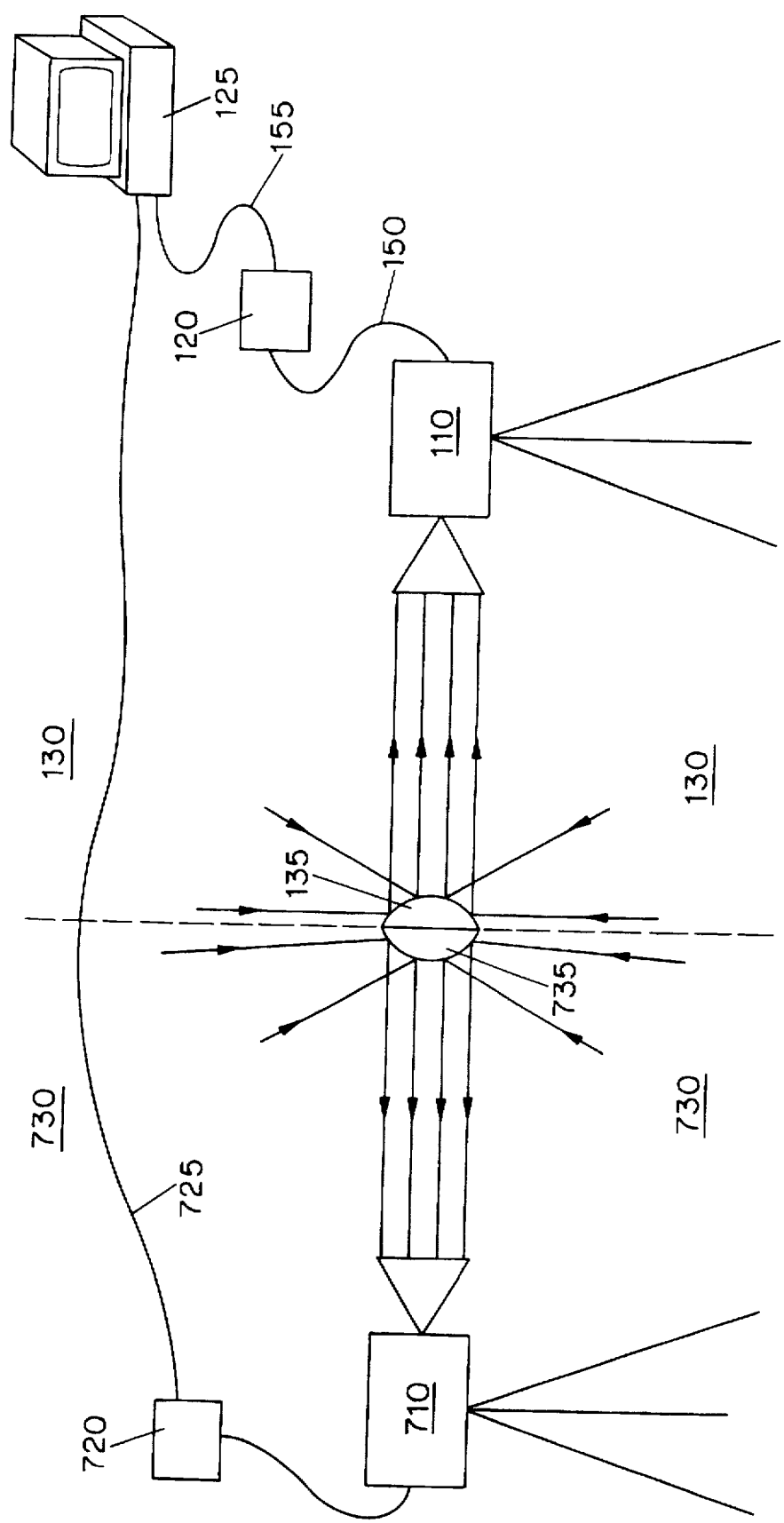
FIG. 7 is a side view of an omnidirectional imaging apparatus with two back-to-back substantially paraboloid-shaped reflectors and two image sensors.

In a further exemplary embodiment of the invention, the omnidirectional imaging apparatus includes an additional substantially paraboloid-shaped reflector 735 as shown in FIG. 7. The additional reflector is positioned to orthographically project an image of an additional hemispherical scene 730 which is complementary to the hemispherical scene 130 so that together they constitute a spherical scene. An additional image sensor 710 is positioned to receive the image orthographically projected by the additional reflector 735.

An image signal representative of the orthographic reflection of the additional reflector 735 is converted to a digital signal by converter 720 in the same manner as described above, and is sent to the same general purpose computer 125 via line 725.

Figure 8:
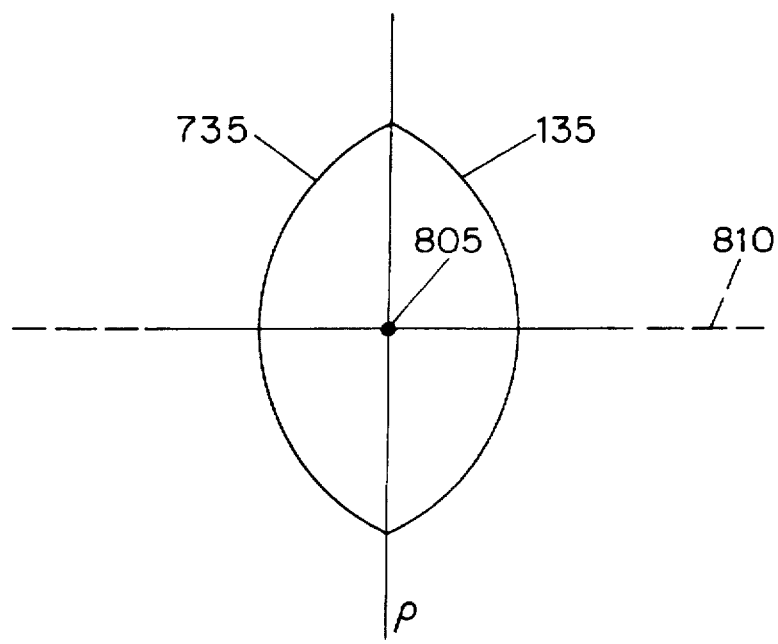
FIG. 8 is a cross-sectional view of two substantially paraboloid-shaped reflectors positioned back-to-back and having a common axis of rotation and a common focus.

As shown in FIG. 8, the reflectors 135 and 735 are positioned back-to-back, share a common axis of rotation 810, which is also the optical axis of the imaging apparatus, and a common focus 805, and are each truncated at a plane p which is substantially perpendicular to the axis of rotation 810 and which includes the focus 805.

Figure 9A:
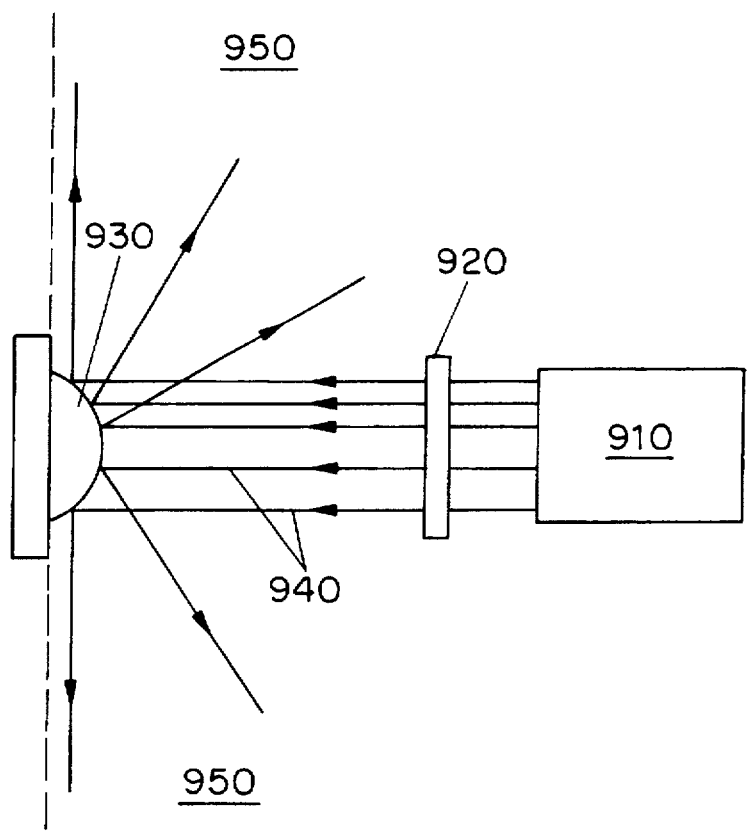
FIG. 9a is a side view of an exemplary embodiment of an omnidirectional image projection apparatus.

FIG. 9a illustrates an exemplary embodiment of an omnidirectional image projection apparatus according to the present invention for projecting an image representing a substantially hemispherical scene as viewed from a single viewpoint. The omnidirectional image projection apparatus includes a collimated light source 910, a transparent medium 920 bearing an image of the substantially hemispherical scene. The transparent image-bearing medium may be a photographic transparency generated by the omnidirectional imaging apparatus discussed above, or a transparent liquid crystal display (LCD) bearing a still or motion picture image of the substantially hemispherical scene.

Light source 910 projects collimated rays of light 940 through the transparent image-bearing medium 920, so as to produce a collimated light beam 940 spatially (and possibly temporarily) modulated with the image on the transparent medium 920. The substantially paraboloid-shaped reflector 930, which in the present embodiment is the mirror discussed above with reference to FIGS. 2 and 3, is positioned to orthographically reflect the collimated image modulated beam 940 so as to project the substantially hemispherical scene.

Figure 9B:
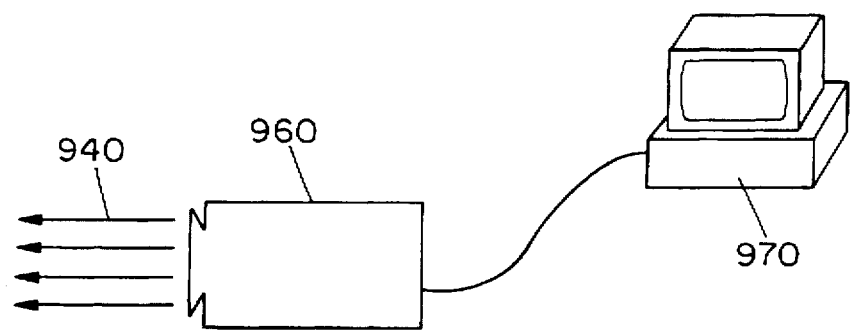
FIG. 9b illustrates an exemplary arrangement for projecting a collimated light beam modulated with an image.

In an alternate exemplary embodiment of the projection system according to the present invention shown in FIG. 9b, the collimating light source and the transparent image-bearing medium are replaced by a video projection system 960 controlled by a general purpose computer 970. The video projection system 960 produces a collimated beam of light 940 which is modulated with the desired image information. To this end, the computer 970 will control the intensity distribution of the emitted light 940 from the projection system 960.

Figure 10:
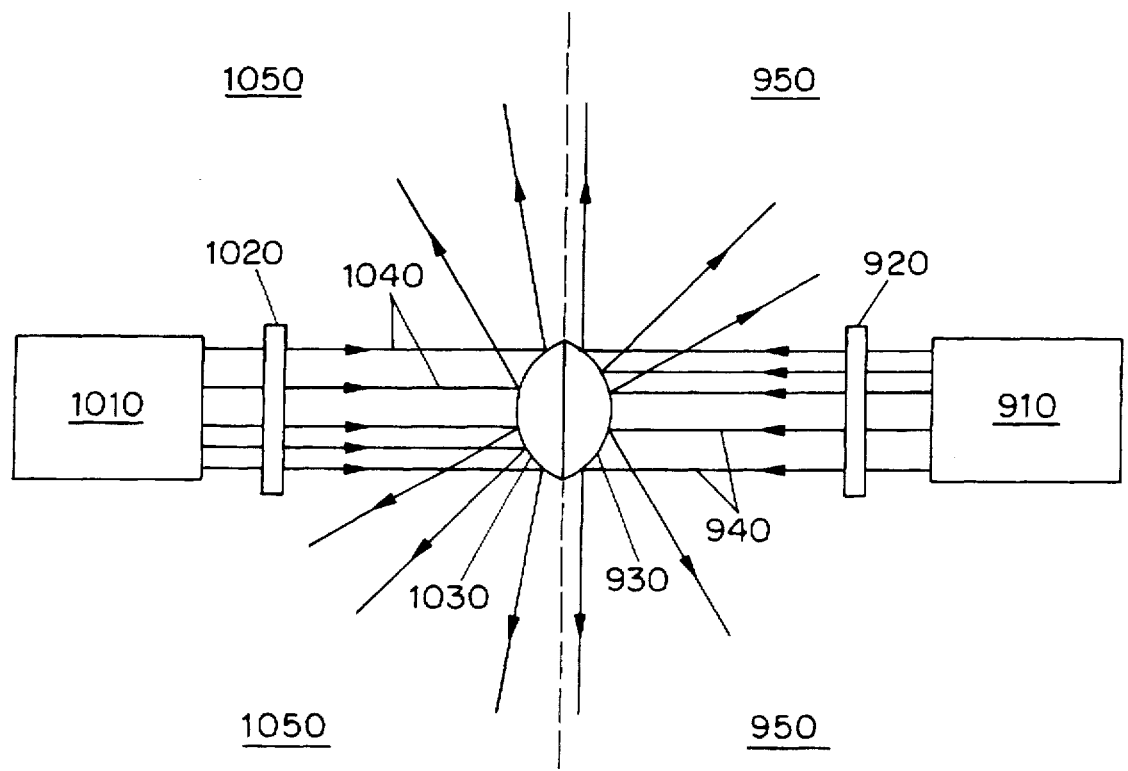
FIG. 10 is a side view of an omnidirectional image projection apparatus with two back-to-back substantially paraboloid-shaped reflectors, and two light sources and two transparent image-bearing media for projecting two collimated light beams with modulated respective images of two substantially hemispherical scenes towards corresponding reflectors.
Figure 11:
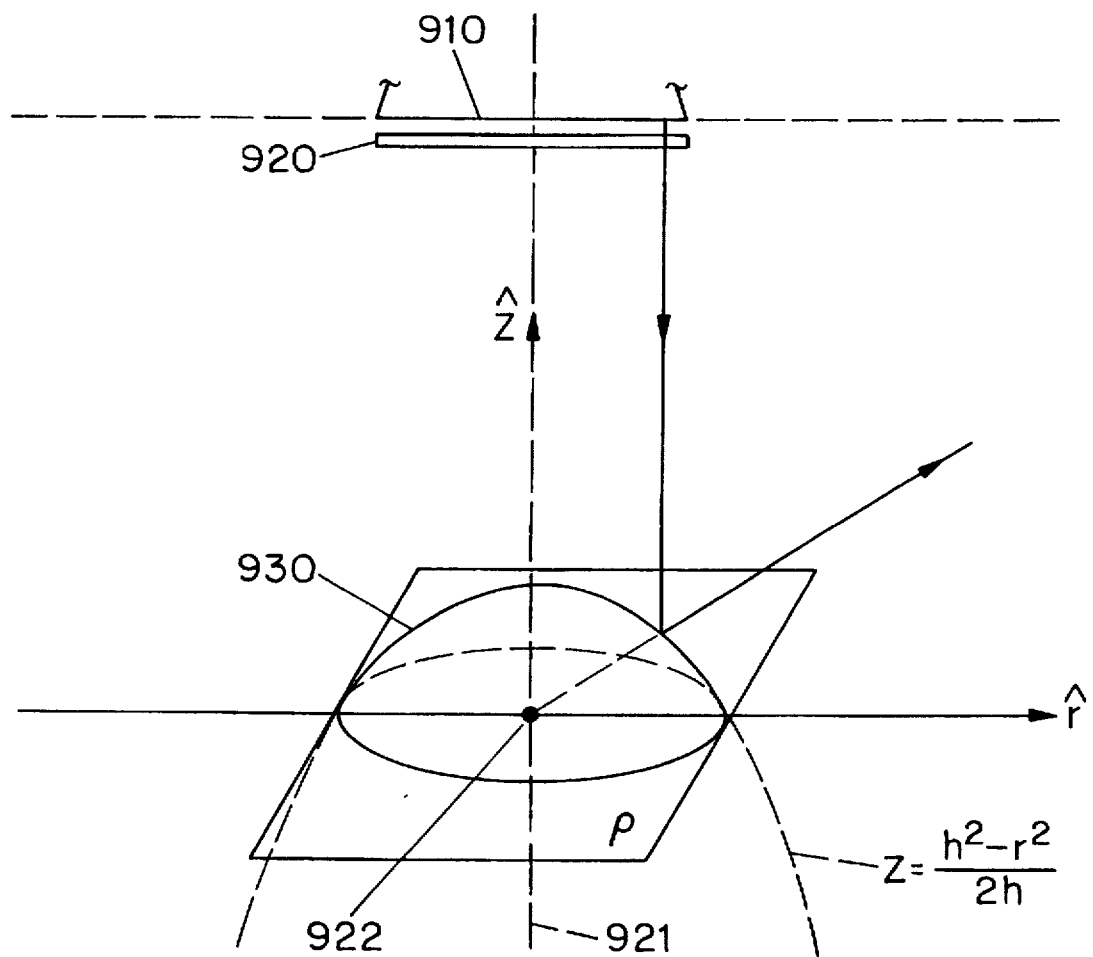
FIG. 11 is a partially isometric view of a paraboloid-shaped reflector of the omnidirectional image projection apparatus mapped into a cylindrical coordinate system.

A further exemplary embodiment of the omnidirectional image projection system according to the invention, shown in FIG. 10, includes an additional transparent image bearing medium 1020 which hold an additional image representing an additional substantially hemispherical scene, an additional collimating light source 1010, and an additional substantially paraboloid-shaped reflector 1030. The substantially hemispherical scene and the additional substantially hemispherical scene are complimentary to one another so that the combination of the two is a spherical scene.

The additional substantially paraboloid-shaped reflector 1030 is positioned to orthographically reflect the additional collimated beam of light 1040 thereby projecting the additional hemispherical scene.

The two reflectors are positioned back-to-back, and share a common axis of rotation and a common focus in the manner shown in FIG. 8. Each is truncated at a plane which is substantially perpendicular to the common axis of rotation and which includes the common focus.

Figure 12:
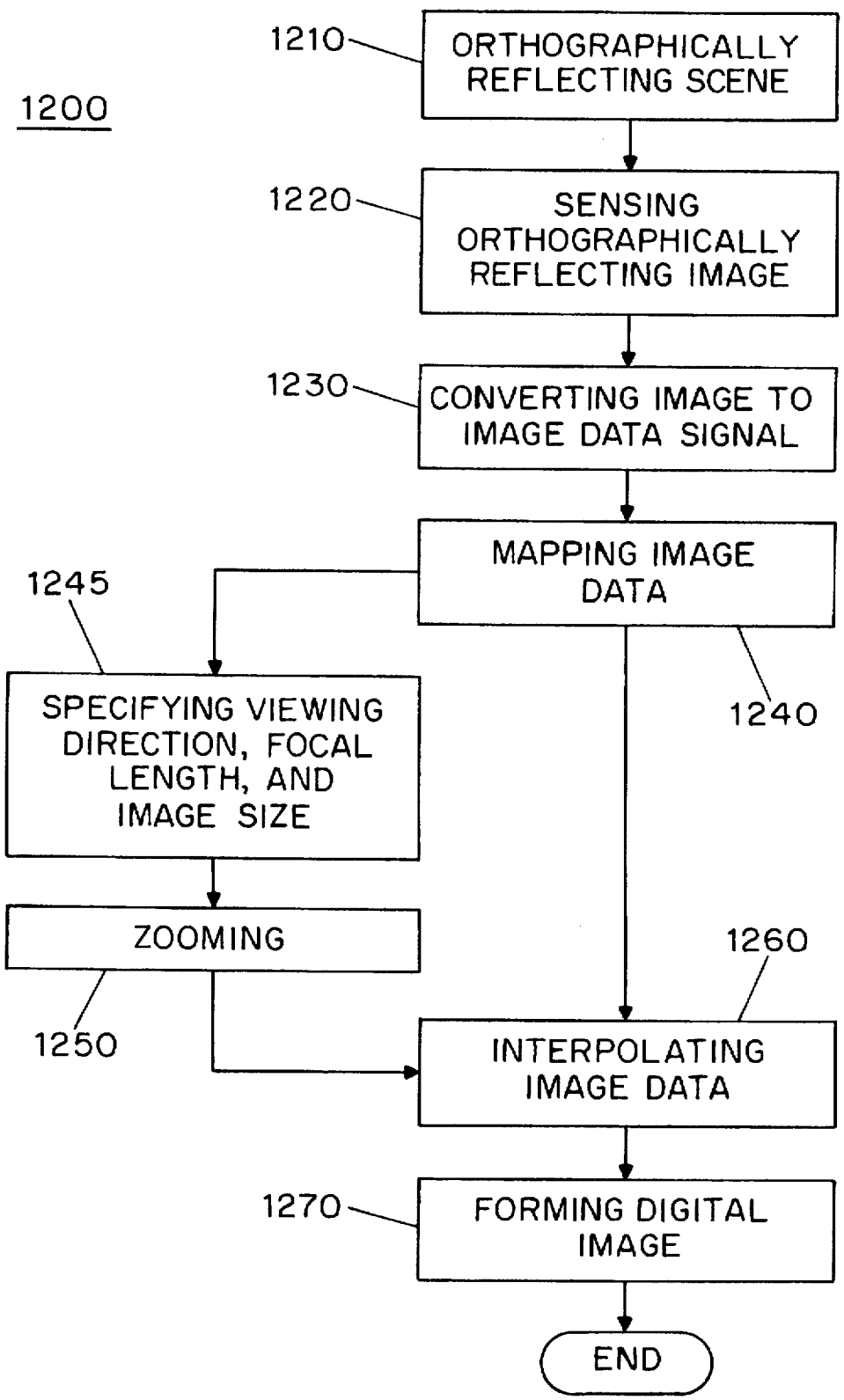
FIG. 12 is a flowchart of an exemplary embodiment of a method for sensing and processing an image of a substantially hemispherical scene from a single viewpoint.

Referring to FIG. 12, there is shown a flow chart 1200 illustrating a method for sensing an image of a substantially hemispherical or spherical scene from a single viewpoint according to an exemplary embodiment of the present invention. Flowchart 1200 shows the necessary steps for sensing the hemispherical scene from a single viewpoint. The method requires orthographically reflecting the substantially hemispherical scene 1210, and sensing the orthographically reflected image 1220.

The method may further include the steps of converting the image signal into image signal data 1230, mapping the image data into a cartesian-coordinate system 1240, interpolating the image data 1260 to derive approximate values for missing image data, and forming a digital image 1270 from the mapped image data and from the interpolated image data. Advantageously the steps of specifying a viewing direction, a focal length, and an image size 1245 and zooming 1250 in on this selected portion of the image data may be performed before the interpolation step.

Figure 13:
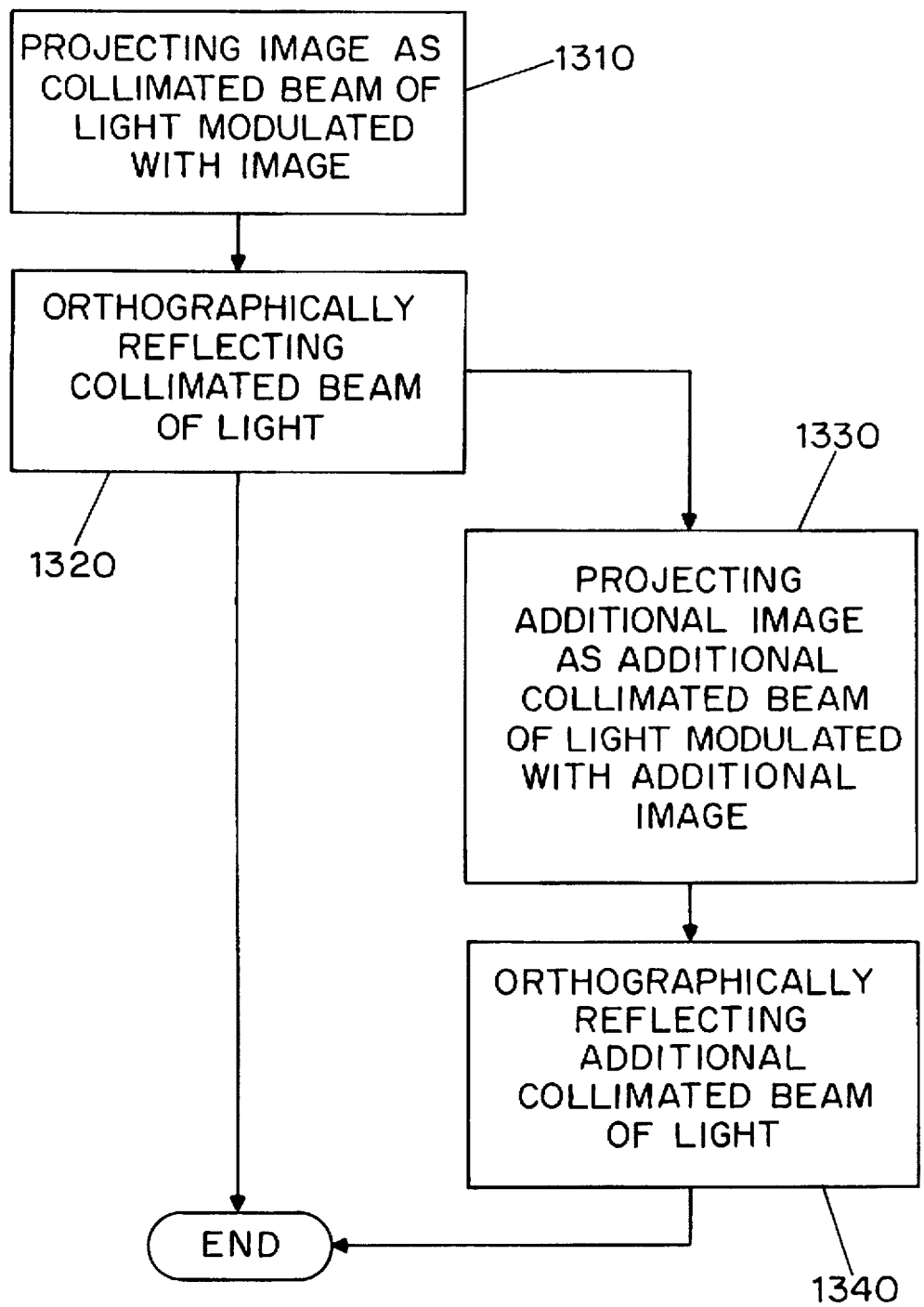
FIG. 13 is a flowchart of a method for projecting an image representative of a substantially hemispherical scene as viewed from a single viewpoint.

Finally, FIG. 13 illustrates a flowchart 1300 for a method for projecting an image representative of a substantially hemispherical scene as viewed from a single viewpoint according to an exemplary embodiment of the present invention. The method includes the steps of projecting a collimated beam of light modulated with the image 1310, and orthographically reflecting the collimated beam of light 1320 on a substantially paraboloid-shaped reflecting surface in a manner such that the single viewpoint of the image coincides with a focus point of the reflecting surface.

The method may also include the steps of projecting as an additional collimated beam of light, an additional image 1330 which is representative of an additional substantially hemispherical scene as viewed from a single viewpoint, and orthographically reflecting the additional collimated beam of light 1340 to recreate the additional substantially hemispherical scene.

Accordingly, the present invention provides an omnidirectional imaging apparatus for sensing an image of a substantially hemispherical scene from a single viewpoint which does not have any moving parts. The inventive apparatus uses orthographic reflection to provide improved image quality and to enable zooming in on any portion of the scene and panning of the scene without requiring complex image reconstruction or complex frame transformation.

The present invention also provides an omnidirectional image projection apparatus which is capable of projecting an image representative of a substantially hemispherical scene as viewed from a single viewpoint.

The above description is merely illustrative of principles involved in the invention. Other modifications of the invention will be obvious to those skilled in the art, and it is intended that the scope of the invention be limited only as set forth in the appended claims.

APPENDIX I compute_image.c

```
#include "stdlib.h"
#include "imageutil.h"
#include "stdio.h"
#include "math.h"

/* int main(int argc, char **argv)   */
main(argc,argv)
int argc;
char *argv[];
{ double sqrt(), atan(), sin(), cos(), acos();
    unsigned char *r, *g, *b;
    unsigned char *red;
    unsigned char *green;
    unsigned char *blue;
    int xsize, ysize;
    int xosize, yosize;
    int i, j, x0, y0, x1, y1;
    double theta, phi;
    double ox, oy, oz;
    double px, py, pz;
    double qx, qy, qz;
    double tempx, tempy, tempz;
    double sx, sy, sz;
    double rad, mag;
    double xs, ys, zs;
```

```
       double dispx, dispy;
       int xcent, ycent, xnew, ynew, xpix, ypix, xpoint, ypoint;
       int xpixel, ypixel, indexx, indexy, xcenter, ycenter;
       float radius, focal;

5   /* printf("completed initializations\n\n"); */ if(argc != 4) {
          printf("arguments: xcenter, ycenter, radius\n");
          exit(0);
       }

10     printf("\n");

xcent = atoi(argv[1]);
       ycent = atoi(argv[2]);
       radius = atof(argv[3]);

printf("omni-image: xcenter =  %d   ycenter = %d  radius =
15     %f\n\n",
              xcent, ycent, (float)radius);

printf("input view pixel [xnovel ynovel]:   ");
       scanf("%d %d", &xnew, &ynew);
       printf("\n");

20     printf("selected view pixel: xnew =   %d   ynew = %d\n\n",
       xnew, ynew);

printf("input new image parameters [xpixels ypixels
       focal]:  ");
```

```
    scanf("%d %d %f", &xpix, &ypix, &focal);
    printf("\n");

printf("output image: xpixels =  %d  ypixels = %d  focal =
    %f\n\n",
5        xpix, ypix, (float)focal);

loadPPM("test.ppm", &r, &g, &b, &xsize, &ysize);

printf("loaded omni-image file\n\n");

xosize = xpix;
    yosize = ypix;

10  /* printf("set new img size, xsize = %d, ysize = %d \n\n",
    xosize, yosize); */ red = (unsigned char*)malloc(xosize * yosize *
    sizeof(unsigned char));
    green = (unsigned char*)malloc(xosize * yosize *
15  sizeof(unsigned char));
    blue = (unsigned char*)malloc(xosize * yosize *
    sizeof(unsigned char));

printf("allocated memory for new image file\n\n");

xcenter = xcent;
20  ycenter = ycent;

xpoint = ynew - ycent;
    ypoint = xnew - xcent;
```

```
        tempx = (double)xpoint;
        tempy = (double)ypoint;
        tempz = (radius*radius - (tempx*tempx +
    tempy*tempy))/(2*radius);

5       ox = tempx/sqrt(tempx*tempx + tempy*tempy + tempz*tempz);
        oy = tempy/sqrt(tempx*tempx + tempy*tempy + tempz*tempz);
        oz = tempz/sqrt(tempx*tempx + tempy*tempy + tempz*tempz);

/* computed optical (z) axis */ tempx = -oy;
10      tempy = ox;
        tempz = 0;

px = tempx/sqrt(tempx*tempx + tempy*tempy + tempz*tempz);
        py = tempy/sqrt(tempx*tempx + tempy*tempy + tempz*tempz);
        pz = tempz/sqrt(tempx*tempx + tempy*tempy + tempz*tempz);

15      /* computed horizontal axis */ tempx = py*oz - pz*oy;
        tempy = pz*ox - px*oz;
        tempz = px*oy - py*ox;

qx = tempx/sqrt(tempx*tempx + tempy*tempy + tempz*tempz);
20      qy = tempy/sqrt(tempx*tempx + tempy*tempy + tempz*tempz);
        qz = tempz/sqrt(tempx*tempx + tempy*tempy + tempz*tempz);

/* computed vertical axis */
```

```
        printf("computed perspective image frame\n\n");

/* raster scan perspective image plane */ for(i=0;i<ypix;i++){
            dispy =  (double)i - (double)ypix/2;
 5          for(j=0;j<xpix;j++){ dispx = (double)xpix/2 - (double)j;

sx = ox * focal + px * dispx + qx * dispy;
                sy = oy * focal + py * dispx + qy * dispy;
                sz = oz * focal + pz * dispx + qz * dispy;

10              mag = sqrt(sx*sx + sy*sy + sz*sz);

sx = sx/mag;
                sy = sy/mag;
                sz = sz/mag;

/* computed vector in direction of current pixel */

15              phi = atan2(sy,sx);
                theta = acos(sz/sqrt(sx*sx + sy*sy + sz*sz));

/* converted vector to polar coordinates */ rad = 2*radius*(1-cos(theta))/(1-cos(2*theta));

/* found radius of intersection on parabola */
```

-29-

```
        xs = rad*sin(theta)*cos(phi);

ys = rad*sin(theta)*sin(phi);

zs = rad*cos(theta);

/* found x, y, z coordinates on paranoloid */

5       /*    printf("xs = %f ys = %f zs = %f\n\n", (float)xs,
        (float)ys, (float)zs);  */
        /*    use xs,ys to read from input image and save in output
        image */

/* check if image point lies outside parabolic image */

10      if(sqrt(xs*xs + ys*ys) > radius){ red[i * xpix + j] = 255;
                green[i * xpix + j] = 255;
                blue[i * xpix + j] = 255;

15      } else{ indexx = (int)ys + xcenter;
            indexy = (int)xs + ycenter;

20      /*      printf("one pixel\n\n"); */

/* write closest color value into pixel */
```

-30-

```
                red[i * xpix + j] = r[indexy * xsize + indexx];
                green[i * xpix + j] = g[indexy * xsize + indexx];
                blue[i * xpix + j] = b[indexy * xsize + indexx];
            }

5       }
    } printf("computed perspective image\n\n");

savePPM("out.ppm", red, green, blue, xpix, ypix);

printf("saved new image file\n\n");

10  system("xv out.ppm &");

free(r);
    free(g);
    free(b);

free(red);
15  free(green);
    free(blue);

printf("freed allocated memory\n\n");

return 0;
}
```

I claim:

1. An omnidirectional imaging apparatus for sensing an image of a substantially hemispherical scene from a single viewpoint, comprising:
   (a) a truncated convex substantially paraboloid-shaped reflector positioned to orthographically reflect an image of said substantially hemispherical scene, said paraboloidal reflector having a focus coincident with said single viewpoint of said omnidirectional imaging apparatus, including said reflector;
   (b) telecentric means, optically coupled to said reflector, for substantially filtering out principal rays of electromagnetic radiation which are not orthographically reflected by said reflector; and
   (c) an image sensor positioned to receive said filtered orthographic reflection of said image.

2. An omnidirectional imaging apparatus according to claim 1, wherein said image sensor comprises a charged coupled device image sensor.

3. An omnidirectional imaging apparatus according to claim 1, wherein said image sensor comprises photographic film.

4. An omnidirectional imaging apparatus according to claim 1, wherein said image sensor comprises a video camera.

5. An omnidirectional imaging apparatus according to claim 1, wherein said reflector comprises a substantially paraboloidal mirror having a surface which substantially obeys the equation expressed in cylindrical coordinates $$z = \frac{h^2 - r^2}{2h},$$

z being an axis of rotation of said surface, r being a radial coordinate, and h being a constant.

6. An omnidirectional imaging apparatus according to claim 1, wherein said reflector has an axis of rotation and comprises a mirror truncated at a plane which is substantially perpendicular to said axis of rotation and which includes said focus of said reflector.

7. An omnidirectional imaging apparatus according to claim 1, wherein said image sensor is positioned along an axis of rotation of said reflector.

8. An omnidirectional imaging apparatus according to claim 1, further comprising a transparent support coupling said reflector and to said image sensor to maintain the relative positions thereof.

9. An omnidirectional imaging apparatus according to claim 1, wherein said image sensor provides an image signal representative of said orthographically reflected image, further comprising an image signal processing apparatus coupled to said image sensor to convert said image signal into image signal data and to map said image signal data into a cartesian-coordinate system.

10. An omnidirectional imaging apparatus according to claim 9, wherein said image signal processing apparatus further includes interpolation means for providing interpolated image data, whereby said interpolated image data and said image signal data are combined to form said digital image.

11. An omnidirectional imaging apparatus according to claim 10, wherein said image processing apparatus further includes means for zooming in on a preselected portion of said digital image to thereby provide an enlarged image of said preselected portion from a predetermined focal distance.

12. An omnidirectional imaging apparatus according to claim 1, further comprising at least one lens optically coupling said image sensor and said reflector and positioned between said image sensor and said reflector.

13. An omnidirectional imaging apparatus according to claim 1, wherein said telecentric means comprises a telecentric lens.

14. An omnidirectional imaging apparatus according to claim 1, wherein said telecentric means comprises a telecentric aperture.

15. An omnidirectional imaging apparatus according to claim 1, further comprising an additional truncated convex substantially paraboloid-shaped reflector positioned to orthographically reflect an image of an additional hemispherical scene from said single viewpoint, said hemispherical scene and said additional hemispherical scene being complementary to one another so that the combination thereof is a substantially spherical scene, and an additional image sensor positioned to receive said orthographic reflection of said image of said additional hemispherical scene.

16. An omnidirectional imaging apparatus according to claim 15, wherein said reflector and said additional reflector are positioned back-to-back, having a common optical axis and a common focus point, and wherein each of said reflectors comprises a mirror truncated at a plane which is substantially perpendicular to said optical axis and which includes said common focus point.

17. An omnidirectional imaging method for sensing an image of a substantially hemispherical scene from a single viewpoint, comprising the steps of:
   (a) orthographically reflecting an image of said substantially hemispherical scene on a substantially paraboloid-shaped reflecting surface such that said single viewpoint of said omnidirectional imaging method, including said step of reflecting said scene on said reflecting surface, coincides with a focus point of said reflecting surface;
   (b) telecentrically filtering out a substantial portion of any principal rays of electromagnetic radiation which are not part of said orthographic reflection; and
   (c) sensing said filtered orthographically reflected image.

18. The method of claim 17, wherein step (b) comprises sensing said substantially orthographically reflected image from a position along an axis of rotation of said reflector.

19. The method of claim 18, further comprising the steps of providing an image signal which is representative of said orthographically reflected image, converting said image signal into image signal data, and mapping said image signal data into a cartesian-coordinate system.

20. The method of claim 19, further comprising the steps of interpolating said image signal data to define approximate values for missing image data, and forming a digital image from said mapped image data and said interpolated image data.

21. The method of claim 20, further comprising the steps of zooming in on a preselected portion of said digital image to thereby obtain an enlarged image of said preselected portion from a predetermined focal distance, interpolating said image data to define approximate values for missing image data, and forming a digital image from said mapped image data and said interpolated image data.

22. The method of claim 18, further comprising the steps of orthographically reflecting an additional image of an additional substantially hemispherical scene, and sensing said additional orthographically reflected image.

* * * * *

UNITED STATES PATENT AND TRADEMARK OFFICE
CERTIFICATE OF CORRECTION

PATENT NO. : 5,760,826

DATED : June 2, 1998

INVENTOR(S) : Shree K. Nayar

It is certified that error appears in the above-identified patent and that said Letters Patent is hereby corrected as shown below:

Col. 5, line 4, "too" should read --to--;

Col. 6, line 53, "that provide" should read --that provides--;

Col. 6, line 59, "r axis" should read --$\hat{r}$ axis--; and

Col. 7, line 48, "$\hat{z}$axis" should read --$\hat{z}$ axis--.

Signed and Sealed this

Second Day of February, 1999

Attest:

Attesting Officer

*Acting Commissioner of Patents and Trademarks*